United States Patent
Pretti et al.

(10) Patent No.: US 9,176,647 B2
(45) Date of Patent: Nov. 3, 2015

(54) SYSTEM AND METHOD FOR POSTING UPDATES

(75) Inventors: Jennifer Anne Pretti, Waterloo (CA); Henry Yao-Tsu Chen, Redmond, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 85 days.

(21) Appl. No.: 13/546,896

(22) Filed: Jul. 11, 2012

(65) Prior Publication Data
US 2014/0019877 A1 Jan. 16, 2014

(51) Int. Cl.
*G06F 3/0484* (2013.01)
*G06Q 50/00* (2012.01)
*H04L 12/58* (2006.01)

(52) U.S. Cl.
CPC .............. *G06F 3/0484* (2013.01); *G06Q 50/01* (2013.01); *H04L 51/32* (2013.01)

(58) Field of Classification Search
CPC ..... H04L 51/04; H04L 12/581; H04L 67/306; H04L 67/22; H04L 51/32; H04L 12/588; H04L 67/26; H04L 51/043; H04L 67/10; H04L 67/24; H04L 12/1831; G06Q 50/01; G06F 17/3089; G06F 3/0482; G06F 17/30
USPC ......... 715/753, 752, 859, 856, 808, 809, 736; 345/176; 379/88.13, 88.12, 88.11, 379/88.22, 88.17; 709/223, 206, 203, 227, 709/217, 228; 455/466
See application file for complete search history.

(56) References Cited

U.S. PATENT DOCUMENTS

| | | | |
|---|---|---|---|
| 7,069,003 B2 | 6/2006 | Lehikoinen et al. | |
| 7,653,692 B2 | 1/2010 | Creamer et al. | |
| 7,747,785 B2 | 6/2010 | Baker, III et al. | |
| 7,765,265 B1 * | 7/2010 | Granito et al. | 709/206 |
| 7,886,000 B1 * | 2/2011 | Polis et al. | 709/203 |
| 8,145,719 B2 * | 3/2012 | Barman et al. | 709/206 |
| 8,504,586 B2 * | 8/2013 | Armstrong et al. | 707/781 |
| 2005/0075097 A1 * | 4/2005 | Lehikoinen et al. | 455/414.1 |
| 2005/0132056 A1 | 6/2005 | Creamer et al. | |

(Continued)

OTHER PUBLICATIONS

European Patent Office, European Search Report issued in European Patent Application No. 12175980, search completed Dec. 19, 2012, 2 pages.

*Primary Examiner* — Doon Chow
*Assistant Examiner* — Wendy Nichols
(74) *Attorney, Agent, or Firm* — Jose Gutman; Fleit Gibbons Gutman Bongini & Bianco P.L.

(57) ABSTRACT

A method comprises determining that a personal message for an IM profile has been updated frequently according to at least one metric; providing an option to post subsequent personal messages in a blog; and after determining that the option has been selected, providing a user interface for entering and posting the subsequent personal messages in the blog. Another method comprises providing an option to follow a blog for a contact, the blog including a plurality of personal message updates for an IM profile of the contact; and after determining that the option has been selected, generating a social feed for the blog. Another method comprises determining that a predetermined number of contacts have selected to follow a blog associated with IM personal message updates for a mobile device; and providing an option to at least one of the mobile device and the contacts to participate in an IM group.

20 Claims, 12 Drawing Sheets

(56) References Cited

U.S. PATENT DOCUMENTS

| | | |
|---|---|---|
| 2005/0273503 A1 | 12/2005 | Carr et al. |
| 2007/0162432 A1 | 7/2007 | Armstrong et al. |
| 2007/0250622 A1* | 10/2007 | Granito .................. 709/224 |
| 2007/0255807 A1 | 11/2007 | Hayashi et al. |
| 2009/0209335 A1* | 8/2009 | Pearce ..................... 463/30 |
| 2009/0222448 A1 | 9/2009 | Caldwell et al. |
| 2010/0274732 A1* | 10/2010 | Grinchenko et al. ........ 705/317 |
| 2010/0287240 A1 | 11/2010 | Rice et al. |
| 2011/0196932 A1* | 8/2011 | Jackson et al. .............. 709/206 |
| 2011/0207439 A1* | 8/2011 | Ross et al. ................. 455/414.1 |
| 2011/0270931 A1 | 11/2011 | Cheng et al. |
| 2012/0110432 A1* | 5/2012 | Mei et al. .................. 715/233 |
| 2012/0197984 A1* | 8/2012 | Rao ........................... 709/203 |
| 2012/0331399 A1* | 12/2012 | Eidelson et al. ............. 715/753 |

* cited by examiner

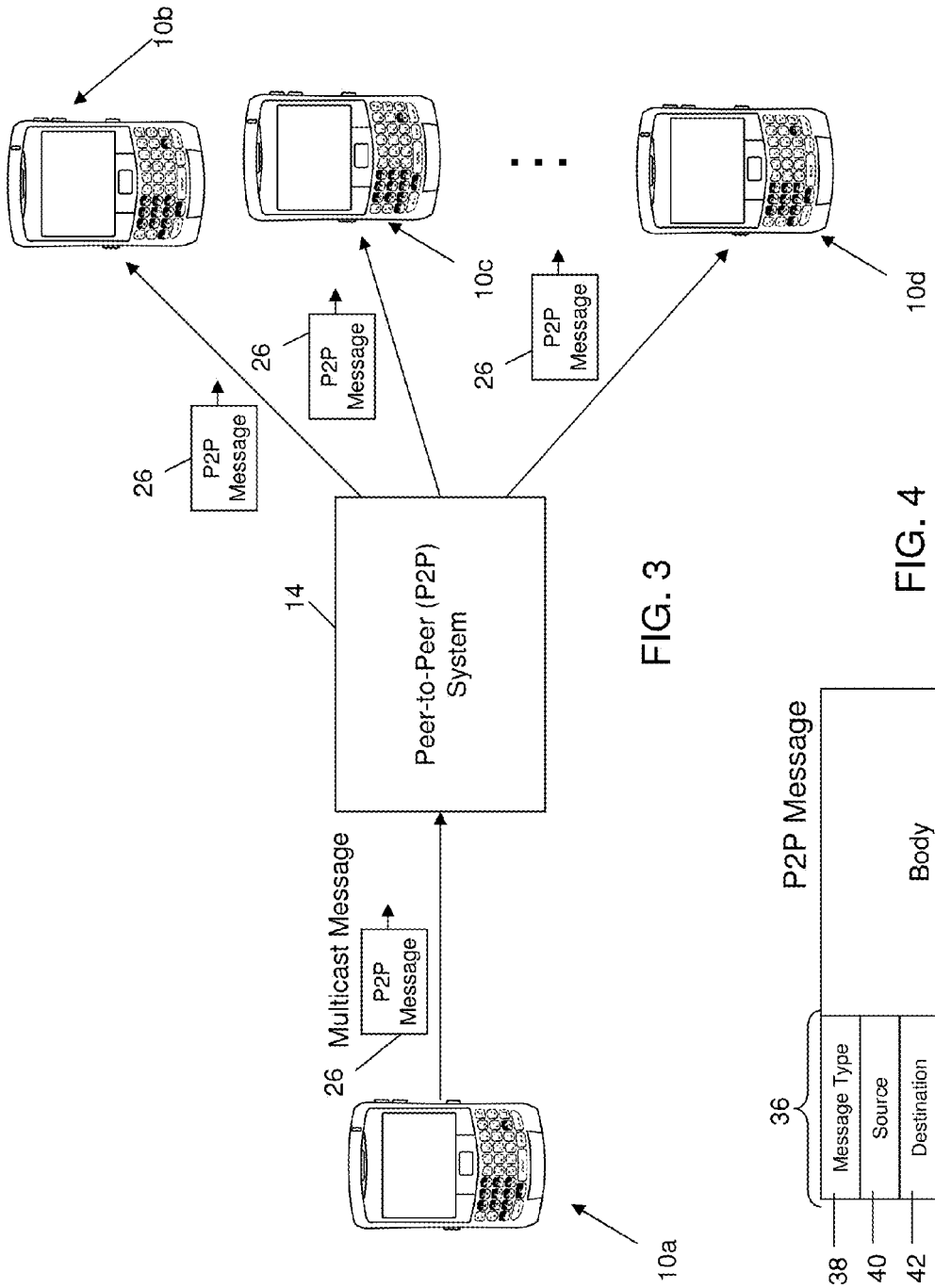

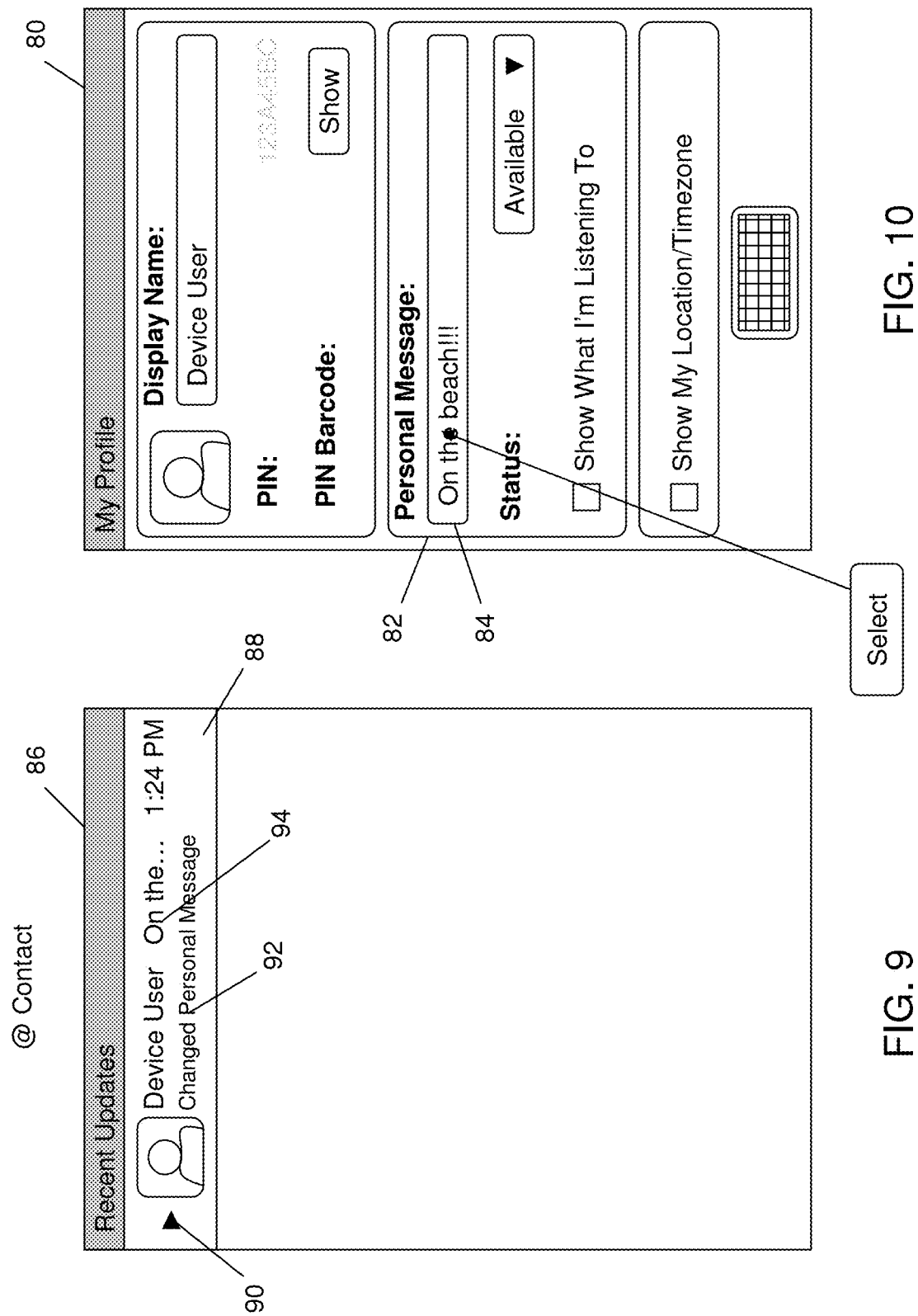

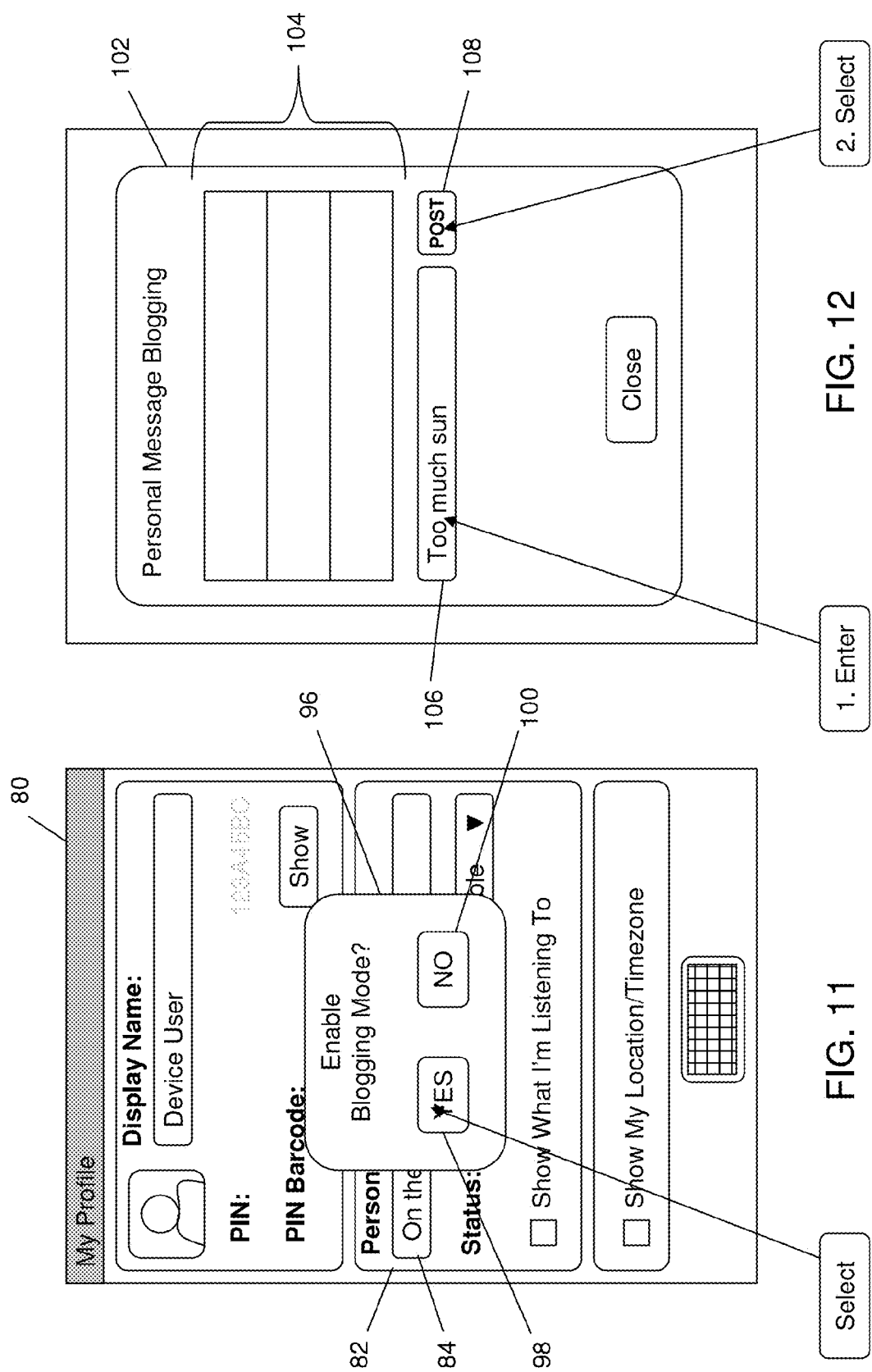

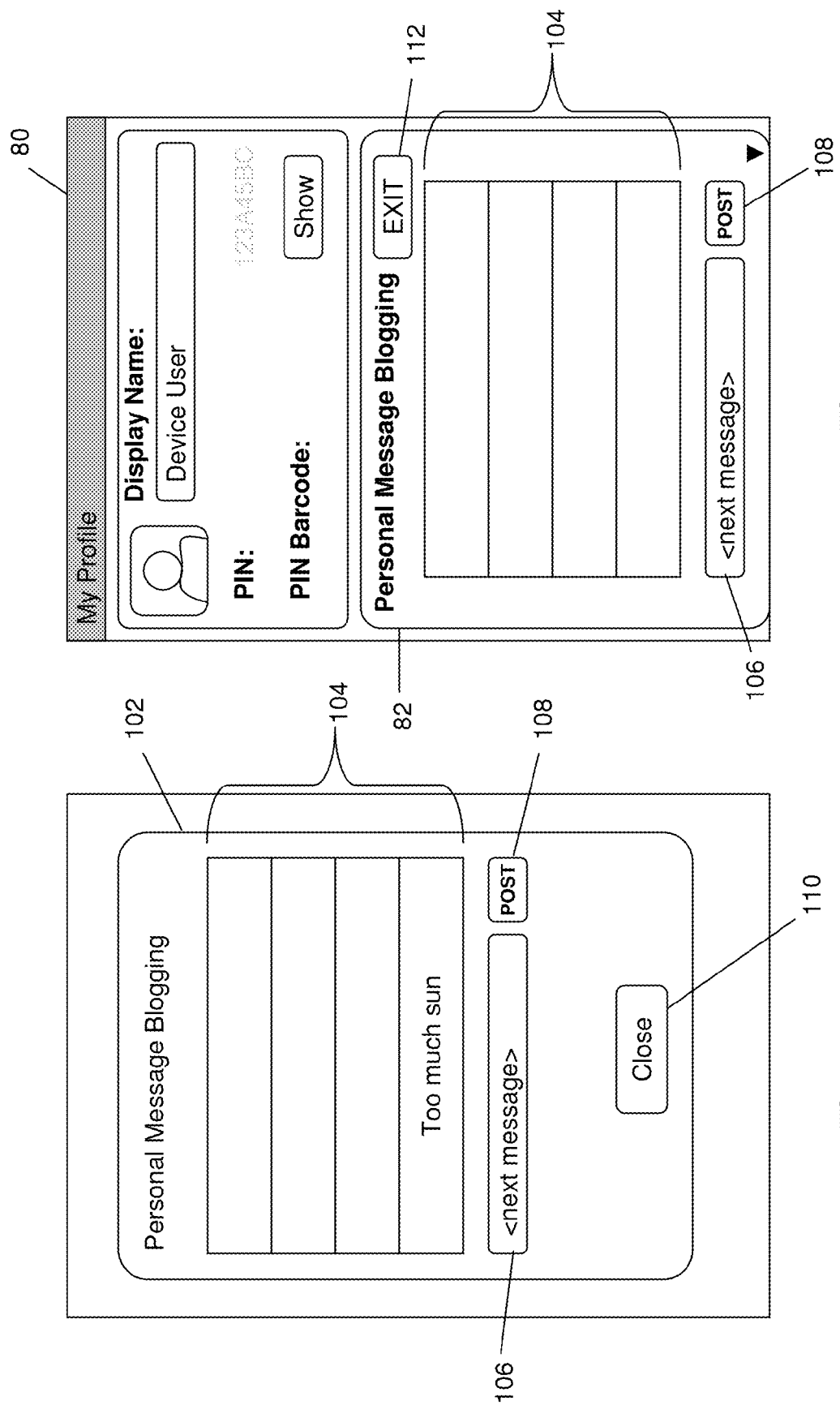

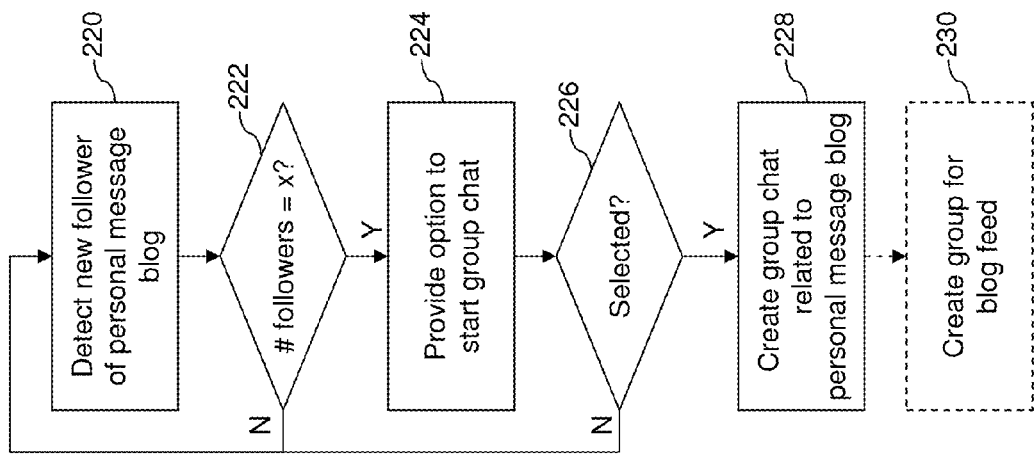
FIG. 21
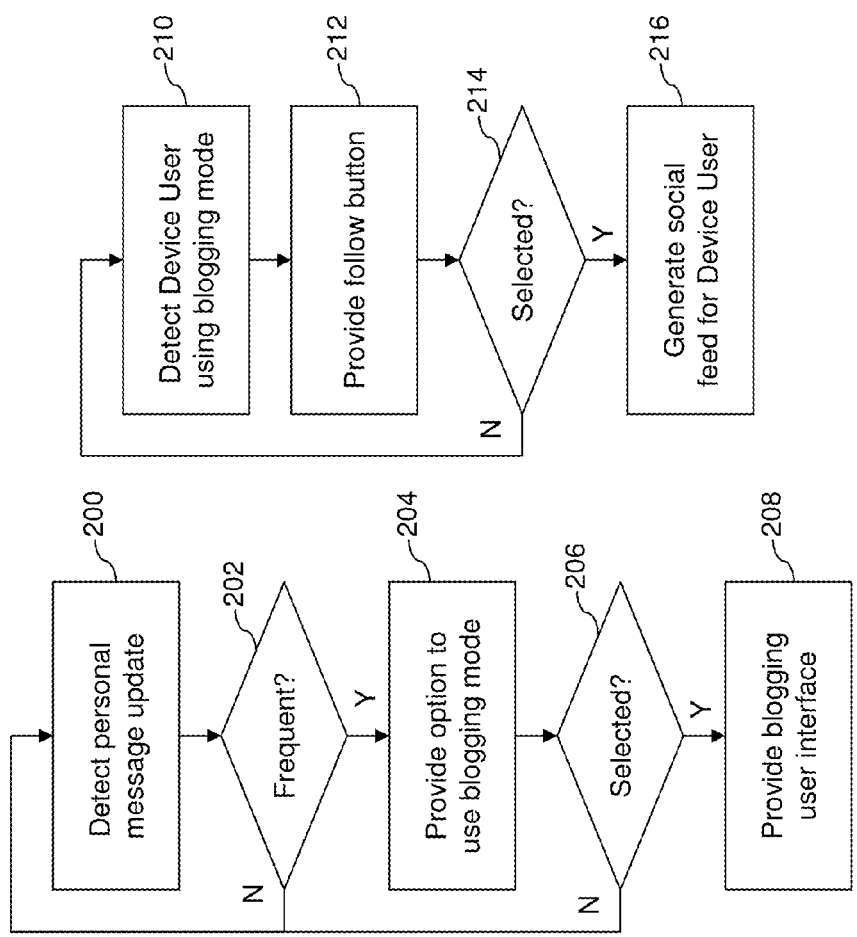
FIG. 20
FIG. 19

SYSTEM AND METHOD FOR POSTING UPDATES

TECHNICAL FIELD

The following relates to systems and methods for posting updates.

DESCRIPTION OF THE RELATED ART

In addition to enabling presence status updates, messaging applications such as those used in instant messaging often enable users to personalize status messages that may be independent of a presence status, and may be broadcast to the user's contacts. For example, a user may have a presence status of "Available" and a personal status message of "Not Feeling Great Tonight". The personal status message allows users to personalize their presence or otherwise convey a mood or other personal information.

While personal status messages are a convenient way for a user to convey additional information about themselves, for users that wish to frequently update their personal status message, the process of accessing a profile and changing the status message each time they wish to change the message they desire to share can become inconvenient and time consuming.

BRIEF DESCRIPTION OF THE DRAWINGS

Embodiments will now be described by way of example only with reference to the appended drawings wherein:

FIG. 3 is a schematic illustration of an example multi-cast message delivery in a peer-to-peer communication system;

FIG. 4 is a schematic illustration of an example peer-to-peer message;

FIG. 9 is a screen shot of an example of a recent updates view;

FIG. 10 is a screen shot of an example of an instant messaging profile view;

FIG. 11 is a screen shot of an example of an instant messaging profile view displaying an enable blogging mode selection mechanism;

FIG. 12 is a screen shot of an example of a personal message blogging user interface;

FIG. 13 is a screen shot of an example of a personal message blogging user interface;

FIG. 14 is a screen shot of an example of an instant messaging profile view with an expanded personal message blogging portion;

FIG. 19 is a flow chart illustrating an example of a set of computer executable operations that may be performed in enabling a blogging mode from personal status message updates;

FIG. 20 is a flow chart illustrating an example of a set of computer executable operations that may be performed in following a status update blog;

FIG. 21 is a flow chart illustrating an example of a set of computer executable operations that may be performed in creating a group from a number of followers of a personal message blog.

DETAILED DESCRIPTION

Figure 1:
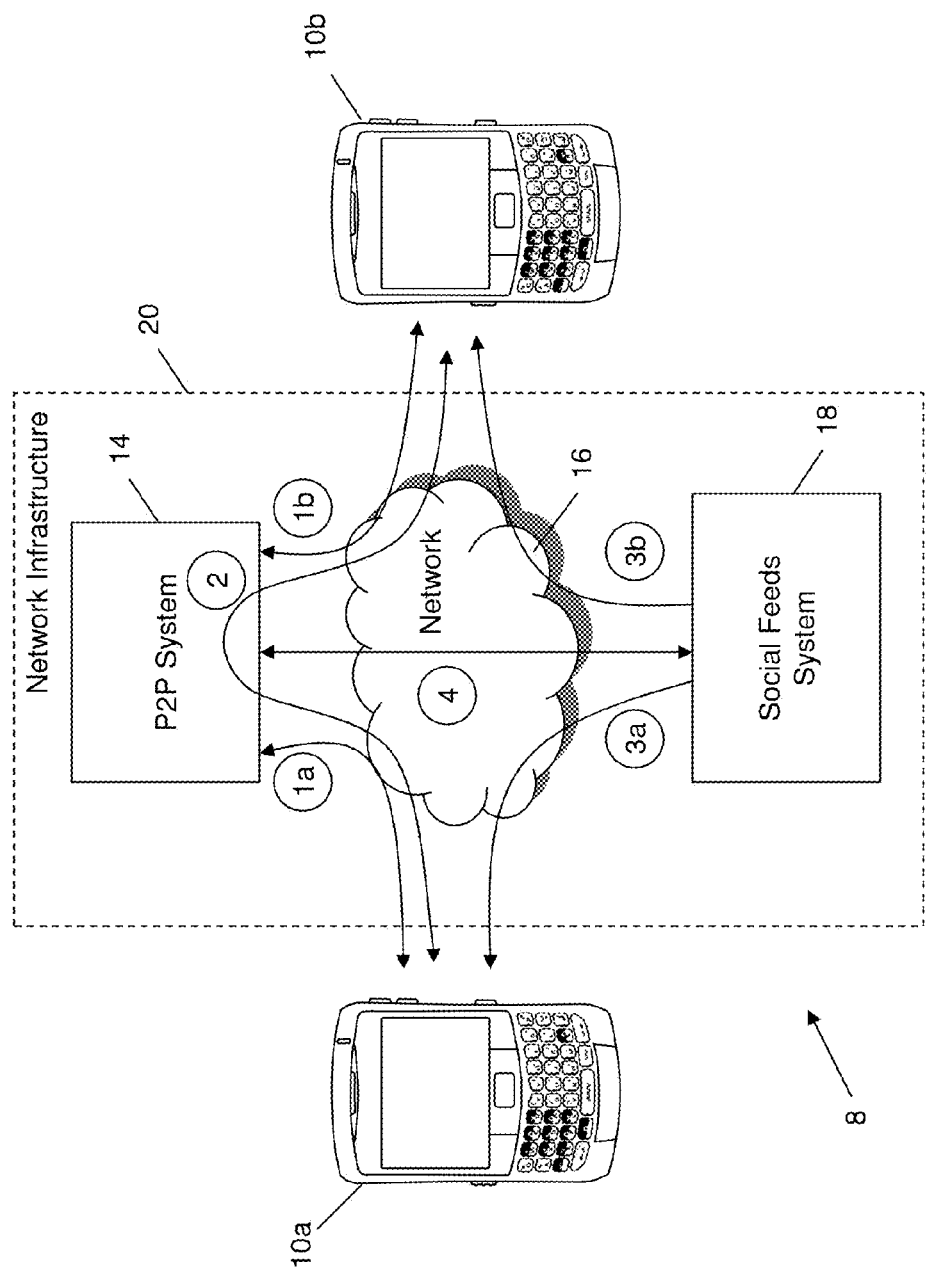
FIG. 1 is a schematic illustration of an example communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that a personal status message that may be updated in connection with a messaging environment can be transformed or otherwise repurposed as a blogging mechanism to enable a user to more conveniently provide a series of personal posts using the same option normally used to create the personal status message.

By tracking the frequency at which a personal status message is updated in connection with the messaging environment (i.e. from within the messaging environment or using an external mechanism), for frequent updaters, the blogging mechanism can be presented as an option or automatically presented to facilitate such frequent updating. In this way, the personal status message can be created into a blogging mode.

Posts made in the blogging mode may then be presented using existing recent updates user interfaces to allow contacts to view the frequent posts. By providing an option to follow the user, social feeds can be created from the blog posts.

Once a certain number of followers subscribe to such a social feed, the messaging system can enable groups to be formed, thus allowing group conversations to be conveniently created to allow the followers to chat with the poster about recent posts, etc.

Referring now to FIG. 1, shown therein is an example of a communication system 8 in which a first mobile device 10*a* communicates with a second mobile device 10*b* via a peer-to-peer (P2P) system 14. In the following description, mobile devices may also be more generally referred to as "mobile devices 10". The P2P system 14 in this example is accessed by the first and second mobile devices 10a, 10b via a network 16. It can be appreciated that the first and second mobile devices 10a, 10b may also communicate with each other using the P2P system 14 by accessing different networks and network types and thus the example shown in FIG. 1 is illustrative only. The first mobile device 10a and second mobile device 10b may also, in this example, receive data feeds from a social feeds system 18. The social feeds system 18 provides multiple social feeds to subscribed or otherwise connected mobile devices 10 (e.g., first mobile device 10a and second mobile device 10b) and may utilize a single application on the mobile devices 10 to enable the mobile devices 10 to display multiple social feeds in a consolidated fashion using a common user interface. It can be appreciated that the social feeds system 18 may incorporate a feed from the P2P system 14, e.g., regarding status updates, presence updates, profile updates, etc.; as well as feeds from various other systems not shown in FIG. 1. In the example shown in FIG. 1, the P2P system 14 and social feeds system 18 are part of or otherwise related to or accessible by a network infrastructure 20.

As illustrated in FIG. 1, the first mobile device 10a may communicate with the P2P system 14 using path 1a, e.g., for providing presence updates, status message updates, profile updates, etc. Similarly, the second mobile device 10b may communicate with the P2P system 14 using path 1b. The first and second mobile devices 10a, 10b may also communicate with each other via the network 16 and the P2P system 14 over path 2, e.g., for exchanging conversational type messages in an instant messaging conversation. The first mobile device 10a may receive social feeds from the social feeds system 18 over path 3a, and the second mobile device 10b may receive social feeds from the social feeds system 18 over path 3b. The P2P system 14 may also be communicable with the social feeds system 18 over path 4, e.g., for creating new social feeds as will be explained in greater detail below.

Figure 2:
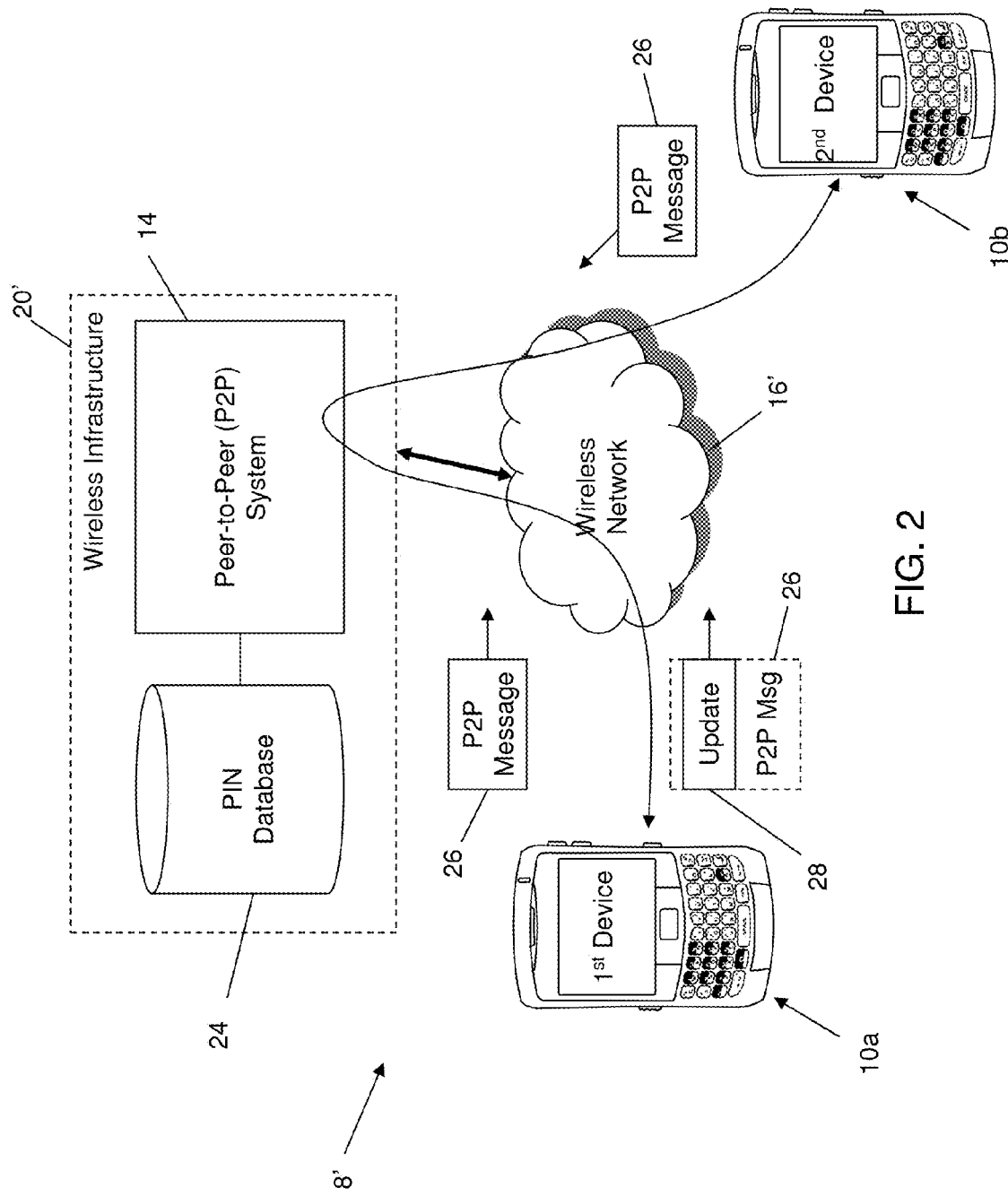
FIG. 2 is a schematic illustration of an example peer-to-peer communication system.

An example of a P2P-based communication system 8' including a wireless infrastructure 20', is shown in FIG. 2. As discussed above, the communication system 8', at least in part, enables the first and second devices 10a, 10b to communicate via a P2P system 14 over path 2, in this example via a wireless network 16'. In the example shown in FIG. 2, the first and second devices 10a, 10b are illustrated as being mobile devices such as smart phones. However, it can be appreciated that other types of electronic devices configured to conduct P2P messaging may also be capable of communicating with or within the communication system 8'. It will also be appreciated that although the examples shown herein are directed to mobile communication devices, the same principles may apply to other devices capable of communicating with the P2P system 14. For example, an application (not shown) hosted by a desktop computer or other "non-portable" or "non-mobile" device may also be capable of communicating with other devices (e.g., including first and second devices 10a, 10b) using the P2P system 14.

The P2P system 14 is, in this example, a component of the wireless infrastructure 20' associated with the wireless network 16'. The wireless infrastructure 20' in this example includes, in addition to the P2P system 14, and among other things not shown for simplicity, a person identification number (PIN) database 24. The PIN database 24 in this example is used to store one or more PINs associated with particular devices, whether they are subscribers to a service provided by the wireless infrastructure 20' or otherwise. To illustrate operation of the P2P system 14 with respect to FIGS. 2 to 4, the first and second devices 10a, 10b will be referred to commonly as "mobile devices 10".

One of the mobile devices 10 may communicate with the other of the mobile devices 10 and vice versa via the P2P system 14, in order to perform P2P messaging or to otherwise exchange P2P-based communications. For ease of explanation, in the following examples, any P2P-based communication may also be referred to as a P2P message 26 as shown in FIG. 2. As also shown in FIG. 2, the P2P message 26 may be used as a medium for sending status message updates, hereinafter referred to as "updates" 28 for brevity.

In some examples, the P2P system 14 may be capable of sending multi-cast messages, i.e. forwarding a single message from a sender to multiple recipients without requiring multiple P2P messages 26 to be generated by such sender. For example, as shown in FIG. 3, the P2P system 14 can be operable to enable a single P2P message 26 to be sent to multiple recipient mobile devices 10b, 10c, and 10d, by addressing the P2P message 26 to multiple corresponding P2P addresses, and having the P2P system 14 multicast the message 26 to those recipient mobile devices 10b, 10c, and 10d.

An example P2P message 26 is shown in greater detail in FIG. 4, and has a format that is particularly suitable for a PIN-to-PIN based system. In a typical P2P protocol, each P2P message 26 has associated therewith a source corresponding to the mobile device 10 which has sent the P2P message 26 and includes a destination identifying the one or more intended recipients. Each P2P message 26 in this example includes a body 34, which contains the content for the P2P message 26 (e.g., text or other data), and a header 36, which contains various fields used for transmitting and processing each P2P message 26. In this example, the header 36 includes a message type field 38 to specify the type of transmission (e.g., chat, registration, block, presence, sharing session etc.), a source field 40 to specify the device address for the sender, a destination field 42 to specify the device address(es) for the one or more intended recipients, an ID field 44 to identify the corresponding P2P application (e.g., see P2P client application 52 in FIG. 5) and a timestamp field 46 to indicate the time (and if desired, the date) at which the P2P message 26 was sent by the designated sender.

It can be appreciated that in this example, the ID field 44 can be used to specify the application ID to identify a P2P application on the mobile device 10. Where the P2P application relates to, for example, an IM system, the message type field 38 can also be used to designate an IM communication, and the ID field 44 may then correspond to a conversation ID, i.e. a conversation thread the message 26 corresponds to (e.g., such that each message 26 is identified by the conversation in which it was sent). The message type field 38 and the ID field 44 can therefore also be used to identify a sharing session, as will be explained in greater detail below.

It will be appreciated that other information or attributes may be included in the P2P message 26, such as a subject field (not shown) to enable a subject for part or all of a conversation (in an IM embodiment) to be transported with the P2P message 26 (e.g., to create new subjects, modify subjects, notify others of subjects, etc.), or application details field (not shown) to provide application-specific information such as the version and capabilities of the application.

The P2P system 14 can utilize any suitable P2P protocol operated by, for example, a P2P router (not shown), which may be part of the wireless infrastructure 20'. It can be appreciated however that a stand-alone P2P configuration (i.e. that does not rely on the wireless infrastructure 20'—not shown) may equally apply the principles herein. The P2P system 14 may also enable mobile devices 10 to communicate with desktop computers, thus facilitating, for example, communications such as instant messaging (IM) between mobile applications and desktop applications on the desktop computer.

The P2P system 14 can be implemented using a router-based communication infrastructure, such as one that provides email, Short Message Service (SMS), voice, Internet and other communications. Particularly suitable for hosting a P2P messaging router, is a wireless router or server used in systems such as those that provide push-based communication services. In FIG. 2, the wireless infrastructure 20' facilitates P2P communications such as instant messaging between mobile devices 10. P2P messaging, such as IMing, is provided by an associated application stored on each mobile device 10, e.g., an IM application, which can be initiated, for example, by highlighting and selecting an icon from a display as is well known in the art. The P2P system 14 routes messages between the mobile devices 10 according to the P2P protocol being used. For example, the P2P protocol may define a particular way in which to conduct IM or other types of messaging.

In general, in a P2P protocol, the sender of the P2P message 26 knows the source address of the intended recipient, e.g., a PIN. Knowledge of the source address may be established when the two devices request to add each other to their respective contact or buddy lists. A particular mobile device 10 can communicate directly with various other mobile devices 10 through the P2P system 14 without requiring a dedicated server for facilitating communications. In other words, the P2P system 14 enables the mobile devices 10 to communicate with each other directly over the wireless infrastructure 20' in accordance with the P2P protocol.

When conducting a P2P session according to the example shown in FIG. 2, the mobile devices 10 can communicate directly with the wireless infrastructure 20 in a client based exchange where, as noted above, an intermediate server is not required. A P2P message 26 sent by one mobile device 10 is received by the wireless infrastructure 20', which obtains the source address for the intended recipient (or recipients) from information associated with the message 26 (e.g., a data log) or from the P2P message 26 itself. Upon obtaining the recipient's address according to the P2P protocol, the wireless infrastructure 20' then routes the message 26 to the recipient associated with the mobile device 10 having such address (or recipients having respective addresses). The wireless infrastructure 20' typically also provides a delivery confirmation to the original sender, which may or may not be displayed to the user. The destination device can also provide such delivery information. The wireless infrastructure 20' may be capable of routing P2P messages 26 reliably as well as being capable of holding onto the P2P messages 26 until they are successfully delivered. Alternatively, if delivery cannot be made after a certain timeout period, the wireless infrastructure 20' may provide a response indicating a failed delivery. The wireless infrastructure 20' may choose to expire or delete a message 26 if a certain waiting period lapses.

Figures 5, 6:
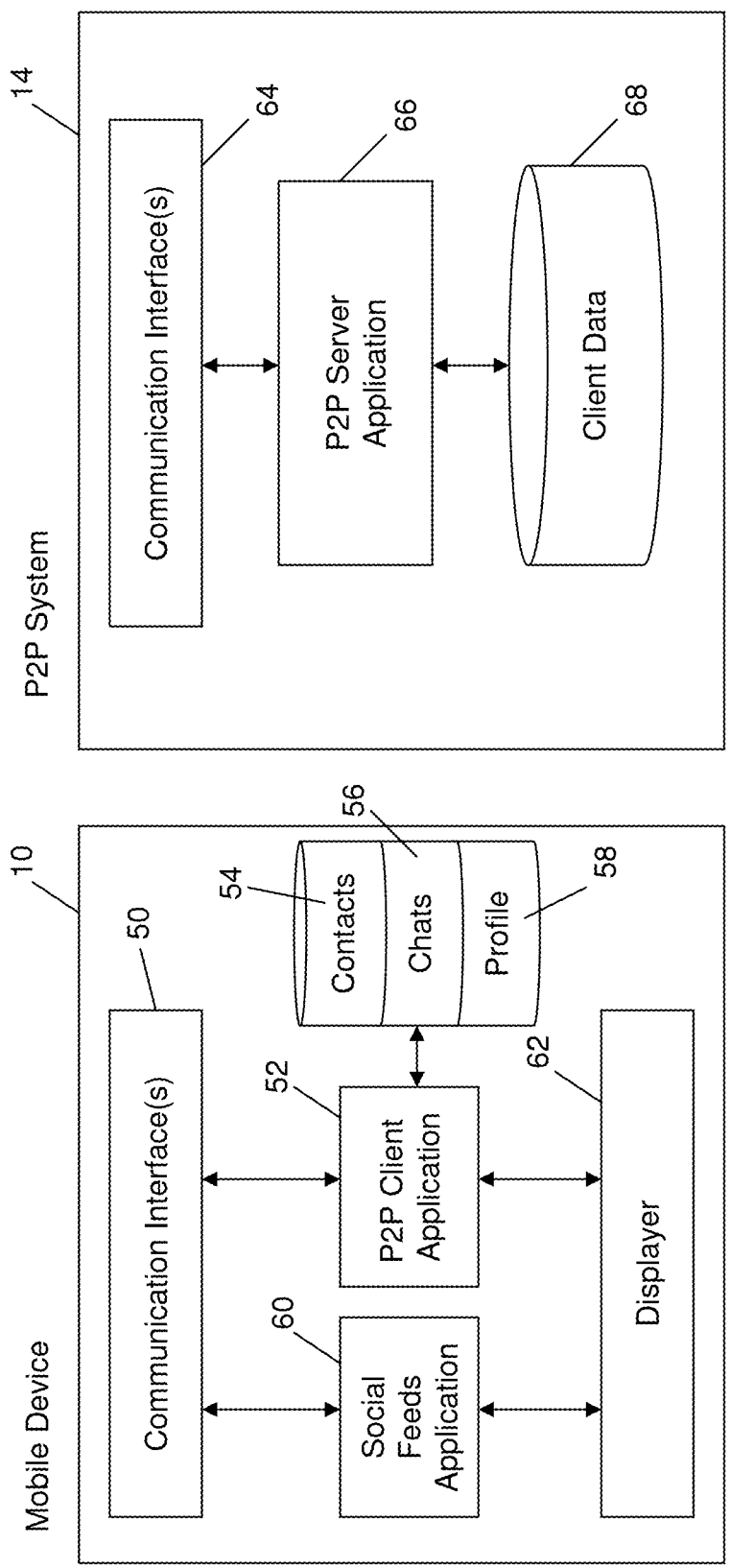
FIG. 5 is a block diagram of an example of a configuration for a mobile device.
FIG. 6 is a block diagram of an example of a configuration for a peer-to-peer server.

FIG. 5 illustrates an example of a configuration for a mobile device 10 enabling participation in the communication system 8. The mobile device 10 in this example includes one or more communication interfaces 50. The communication interface(s) 50 may enable, for example, access to the network 16, as well as the ability to utilize short range communication protocols, etc. The mobile device 10 has a P2P client application 52 for participating in P2P based messaging, e.g., IMing. The P2P client application 52 includes or otherwise has access to one or more memory or storage elements for storing contacts 54, copies of conversations or "chats" 56, and profiles 58. The profiles 58 may include various user-selectable and/or definable settings such as availability, status message, picture, sharing options, etc. The mobile device 10 also includes a social feeds application 60 for displaying multiple social feeds in a common user interface. The P2P client application 52 and social feeds application 60 (among other applications, components, and software elements not shown in FIG. 5) may utilize a displayer 62 for rendering user interface elements on a display screen of the mobile device 10.

FIG. 6 illustrates an example of a configuration for the P2P system 14. In this example, the P2P system 14 includes, among other things not shown, one or more communication interfaces 64 to enable the P2P system 14 to communicate with or be communicated with by mobile devices 10, other network infrastructure components, etc. The P2P system 14 also includes a P2P server application 66 corresponding to the P2P client application 52 running on the mobile devices 10. The P2P server application 66 includes or otherwise has access to client data 68 corresponding to respective ones of the mobile devices 10. For example, the P2P server application 66 may receive and update presence status changes provided by a particular mobile device 10 such that presence status updates can be distributed or otherwise communicated to other mobile devices 10 corresponding to contacts 54 of that particular mobile device 10.

The user of a mobile device 10, hereinafter the "Device User", may participate in instant messaging based communications via the P2P system 14 as exemplified above. As is well known in the art, instant messaging based systems often include a "presence" element, which enables users to select one of a plurality of presence statuses, which are communicated to their contacts 54. In addition to updating presence statuses, the profile 58 for the Device User may also provide the ability to personalize the IM experience, e.g., by adding and updating a personal message.

Figures 7, 8:
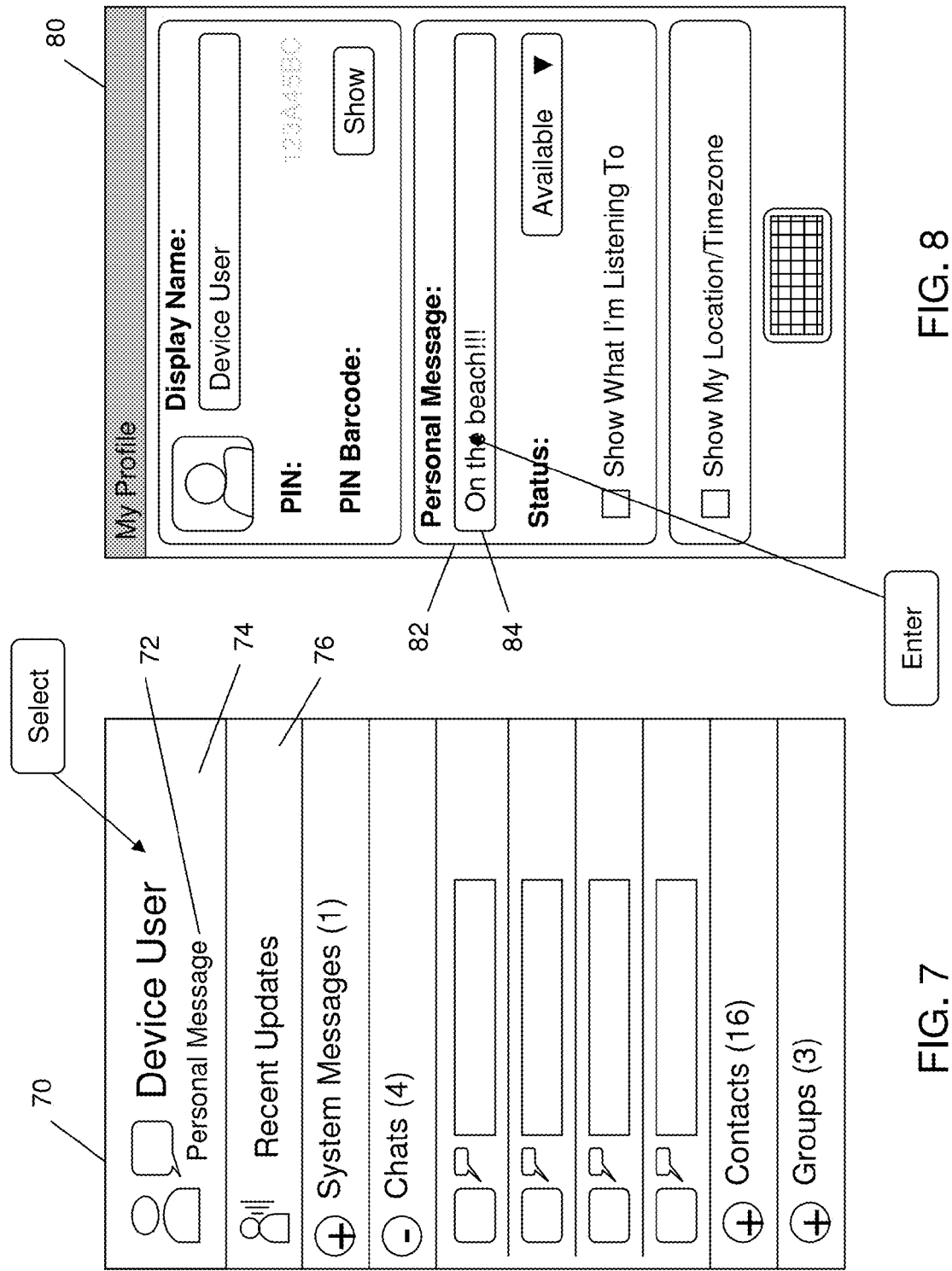
FIG. 7 is a screen shot of an example of an instant messaging list view.
FIG. 8 is a screen shot of an example of an instant messaging profile view.

FIG. 7 illustrates a screen shot of an IM list view 70, which includes, among the other things shown in FIG. 7, a banner portion 74 and a recent updates portion 76. The banner portion 74 includes various identifying information related to the Device User (including name, picture, etc.). Of the identifying information shown in FIG. 7 is a personal message 72. The personal message 72 may be entered by the Device User and can be updated periodically at the discretion of the Device User. The changes to the personal message 72, similar to presence updates, may be communicated to contacts 54 of the Device User such that the updates 28 can be viewed by selecting the recent updates 76 entry of the list view (at the corresponding mobile device 10 for the contact 54).

By selecting the banner 74 as shown in FIG. 7, or providing another suitable input (e.g., from a menu of options, convenience key or other input), a profile view 80 may be displayed as shown in FIG. 8. The profile view 80 enables the Device User to review, specify, update, delete, etc., various information. Of the information that can be specified, updated, and deleted is the personal message 72 shown, for example, in the list view 70. The profile view 80 includes a user interface portion 82 that includes a personal message entry box 84. By entering text in the personal message entry box 84 as shown in FIG. 8, the personal message 72 for the Device User 72 may be specified (if previously blank), changed (if a previous personal message 72 had been specified), or deleted (if previously entered text is removed). It can be appreciated that when no personal message 72 is specified, the list view 70 may specify a presence status in the banner 74, as an alternative to the personal message 72.

It may be noted that updating the personal message 72 by accessing a profile view 80 as shown in FIGS. 7 and 8 is only one example way in which to update a personal message 72.

For example, a menu, convenience key or other suitable input may be provided to enable the personal message 72 to be updated, or updates to be triggered, from any view, whether from within the P2P client application 52 (e.g., the list view 70), or outside of the P2P client application 52 (e.g., from a home screen, remotely using a $3^{rd}$ party application, etc.). Moreover, the personal message 72 may also be automatically updated according to actions, events, accomplishments, etc., that are detected while, for example, using a $3^{rd}$ party application. Such automatic updates may also be used to trigger the blogging mode herein described.

As discussed above, after a change has been made to the personal message 72, an update 28 may be sent to the P2P system 14, which can be provided to various other mobile devices 10 associated with the Device User's contacts 54. The mobile devices 10 associated with contacts 54 may then update a recent updates view 86, shown in FIG. 9 by way of example. The recent updates view 86 can be accessed by the contact 54 selecting the recent updates entry 76 in the list view 70 on that contact's mobile device 10. As illustrated in FIG. 9, a recent update entry 88 associated with Device User is added to the recent updates view 86. The entry 88 includes an arrow 90 or other identifier that when selected expands the entry 88 to show multiple updates associated with the same contact 54 (Device User in this example). The entry 88 also includes a most recent update identifier 92 indicating to what event the most recently received update for that contact 54 relates. For example, by expanding the entry 88 by selecting the arrow 90, other updates related to changes to photos may also be shown. The entry 88 also includes, among other information related to Device User, at least a portion 94 of the current personal message 72 used by Device user.

As discussed above, the Device User may wish to periodically update their personal message 72 to provide regular updates as to what they are doing, feeling, etc. To change the personal message 72 again, in the example shown in FIG. 7, the profile view 80 would be accessed (e.g., as shown in FIG. 7 by selecting the banner 74) and would show the current personal message 72 in the personal message entry box 84. By selecting the personal message entry box 84 as shown in FIG. 10, the Device User may change the personal message 72 by entering new text or modifying the existing text. The personal message 72 may also be removed by deleting all text in the personal message entry box 84. It has been recognized that if the Device User wishes to frequently update their personal message 72, accessing the use of a single entry box 84 to make updates and utilizing a menu or other mechanism to save the change, can detract from the user experience. It has been found that by determining that the personal message 72 is being updated frequently, according to a predefined one or more metrics, the P2P client application 52 may provide a more convenient user interface for such "frequent updaters". By enabling a more convenient user interface for frequent updates to a personal message, a "blogging mode" is provided that allows updates 28 to be made, captured, and conveyed to the contacts 54 in a "live" or "real-time" fashion. By having access to the underlying P2P protocol used by the P2P client application 52, the updates 28 can be sent to other mobile devices 10 to be viewed in the recent updates view 86 in a form that resembles a blog.

As shown in FIG. 11, after detecting that the Device User has been frequently updating the status message 72, an enable blogging mode selection box 96 may be displayed, which enables the blogging mode to be initiated by detecting selection of a yes button 98 or declined by selecting a no button 100. It can be appreciated that various metrics may be used to determine that the personal message 72 is being updated "frequently", and such metrics can be predefined defaults, or user definable. For example, the metric may be that a frequent updater is one that changes their personal message 72 more than a particular number of times in an hour, half day, day, week, etc. In another example, the amount of time between updates 28 may be tracked and used to determine that a frequenter updater is one that updates their personal message 72 within a particular number of minutes, e.g., 20 minutes. It can be appreciated that multiple metrics may be used to distinguish between frequent updaters and those that, for example, change their mind and make an immediate correction. For example, two metrics may be used, wherein the updates 28 are deemed to be "frequent" if the time between updates 28 is a particular amount of time and at least a particular number of updates 28 have been made within another particular amount of time. It can also be appreciated that the enable blogging mode selection box 96 may be used to prompt a user to enter the blogging mode from any user interface or view of a user interface. For example, if a personal message 72 is updated from within a list view 70, the enable blogging mode selection box 96 (or a similar mechanism) can be displayed within that view. As such, the example shown in FIG. 11 is illustrative only.

Initiation of the blogging mode may result in the presentation of various more convenient user interface options. For example, as shown in FIG. 12, a separate personal message blogging user interface 102 may be generated and provided to the Device User. The blogging user interface 102 may be created as another view within the P2P client application 52, or may be separated therefrom such that the Device User can access the blogging user interface 102 independent of the P2P client application 52. In this way, the P2P client application 52 can be used as a vehicle to facilitate the creation and maintenance of a blog that corresponds to updated entries to the personal message 72. The blogging user interface 102 may also be triggered, or otherwise accessed from, outside of the P2P client application 52, e.g., while using a $3^{rd}$ party application operable to update status messages based on detected events, actions, etc., as discussed above.

The blogging user interface 102 facilitates more frequent updating by providing a list of previous updates 104, a next message entry box 106, and a POST button 108. By entering text in the personal message entry box 106 and selecting the POST button 108 as shown in FIG. 12, a next update may be conveniently added to the list 104 as shown in FIG. 13. The personal blogging user interface 102 therefore enables the Device User to conveniently view previous updates, enter and post new updates, and in parallel, the P2P client application 52 can update the various IM views to reflect the changing personal message 72, as well as send updates 28 to the contacts 54. A close button 110 may be selected to close the blogging user interface 102. It can be appreciated that the blogging user interface 102 may be re-initiated by adding another entry to the personal message entry box 84 in the profile view 80 or by selecting a menu option or using any other suitable input. As such, it can be appreciated that once the blogging user interface 102 has been initiated, the Device User may be given the opportunity to maintain the personal message blog for later use. In other examples, the blogging user interface 102 may be configured to persist only for individual blogging "sessions".

The profile view 80 may also be reconfigured to enable the personal message blogging to occur within that view, as shown FIG. 14. The portion 82 of the profile view 80 that includes the personal message entry box 84 may be expanded as shown in FIG. 14 to provide the list of updates 104, a next message entry box 106, and a POST button 108, similar to the blogging user interface 102.

Figure 15:
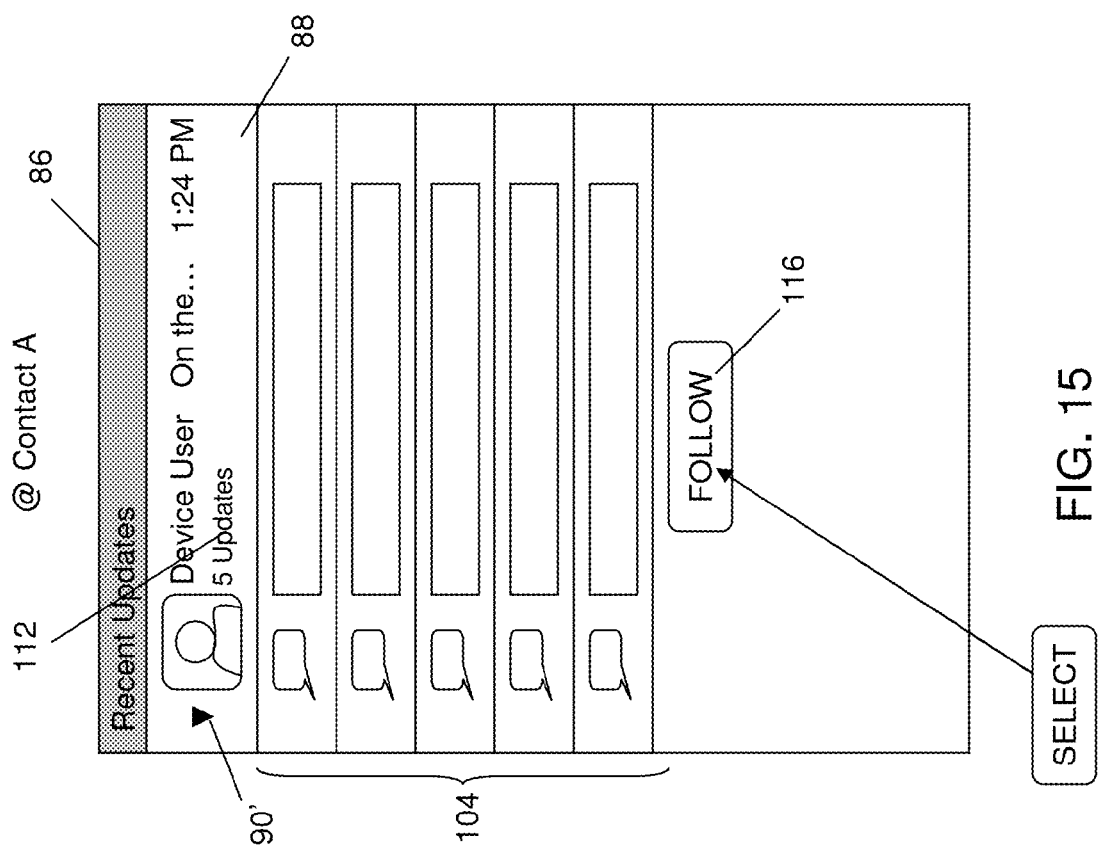
FIG. 15 is a screen shot of an example of a recent updates view illustrating an expanded view with a series of blog entries and a follow button.

It has also been recognized that the contacts receiving the various personal message updates 28, particularly when the updates 28 are being sent in a "live" blogging session, may wish to follow the Device User's updates in the same way that other social feeds can be followed individually. Turning now to FIG. 15, in the recent updates view 86 of a contact 54 of the Device User (Contact A in this example), by selecting the arrow 90 (shown in FIG. 9), the list of updates 104 can be seen in relation to Device User. As shown in FIG. 15, a modified arrow 90' may be provided to identify an expanded state for the Device User updates. When the list of updates 104 includes a stream of personal message updates 28 that have been sent in a blogging mode, the contact 54 can be provided with a FOLLOW button 116 in, for example, the recent updates view 86. By selecting the FOLLOW button 116 as shown in FIG. 15, a social feed can be created that relates to the Device User's personal message blog as shown in FIG. 16.

Figure 16:
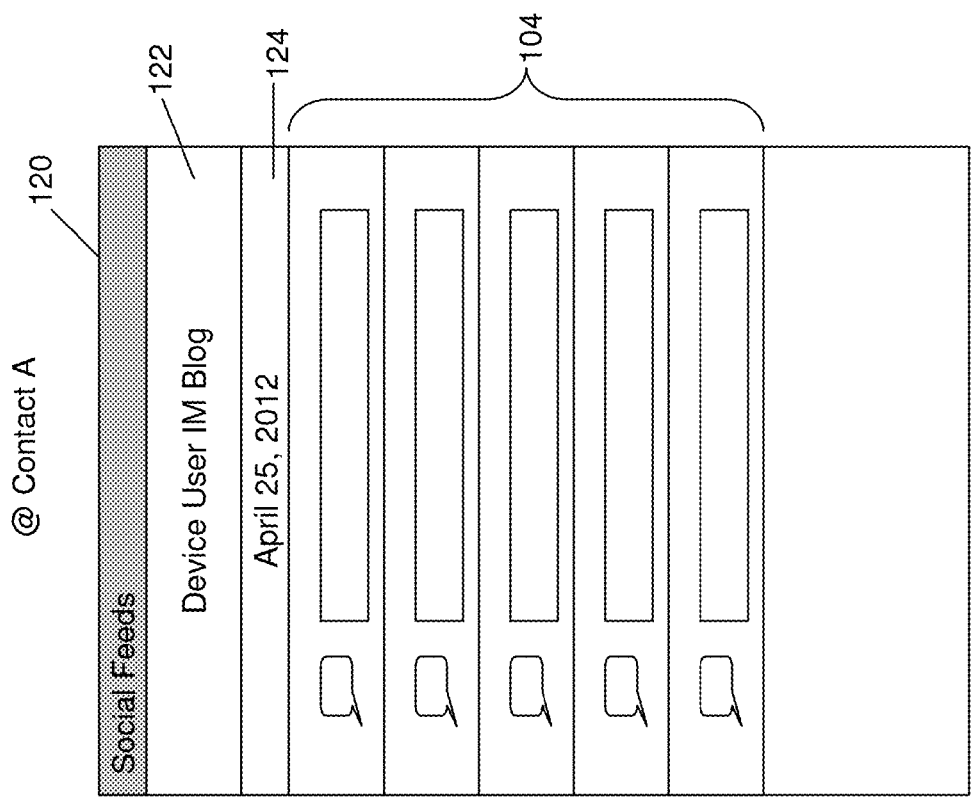
FIG. 16 is a screen shot of an example of a social feeds user interface.

A social feeds view 120 is shown in FIG. 16, which may be displayed by selecting the FOLLOW button 116 or by initiating the social feeds application 60. A feeds selection pane 122 is displayed, which include an option (not shown) to select from a list of social feeds. FIG. 16 illustrates the Device User IM Blog social feed, which includes the list of updates 104 associated with the personal message updates 28, and may include date/time information 124. It can therefore be appreciated that providing the FOLLOW button 116 in the recent updates view 86 enables Contact A to move the personal message blog to another venue, namely a social feed. Moving to the social feeds environment enables Contact A to access and view the personal message blog for Device User (and other contacts 54 if applicable) separately from the IM or other P2P environment. By creating a social feed, the social feeds system 18 can also be configured to provide another mechanism by which mobile device users can subscribe to feeds related to Device User's personal message updates 28.

Figure 18:
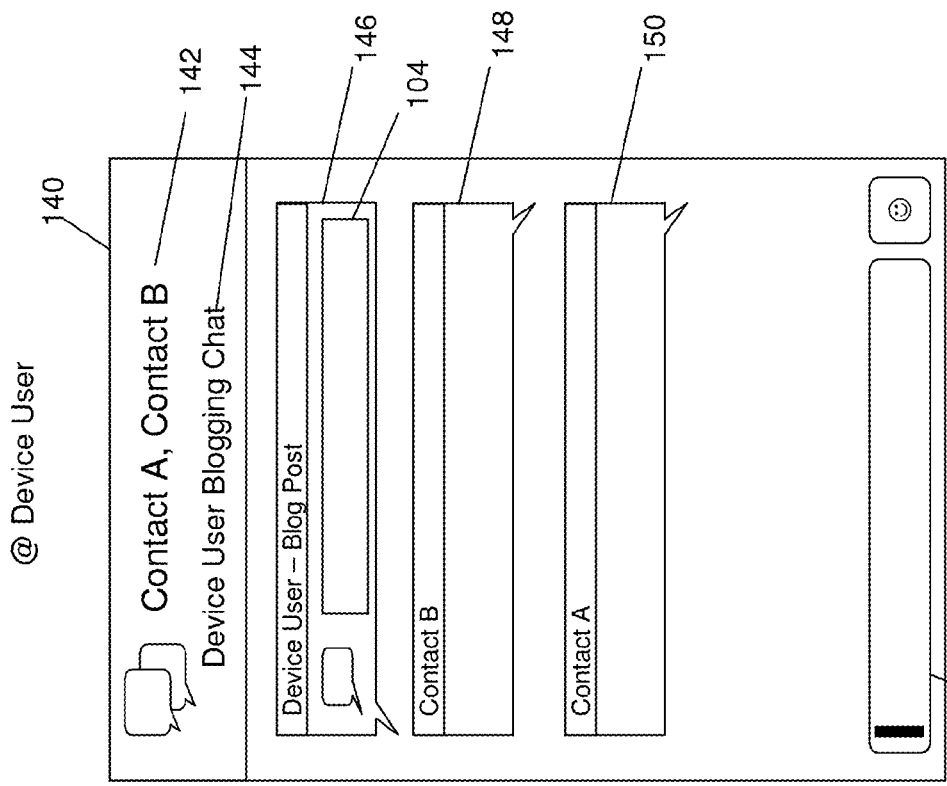
FIG. 18 is a screen shot of an example of a group instant messaging chat.
Figure 17:
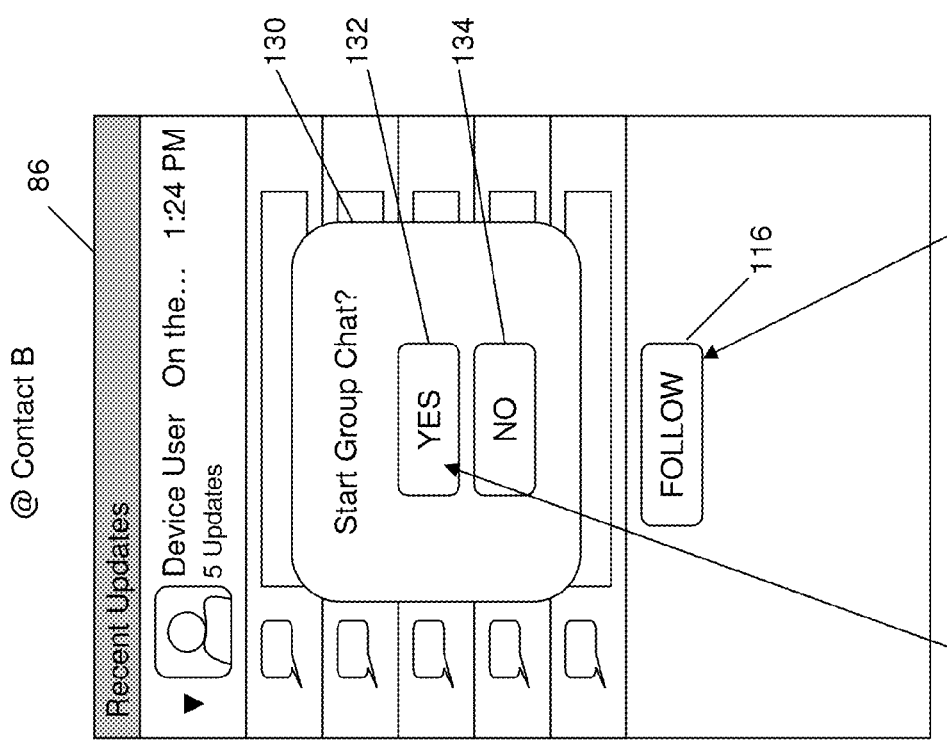
FIG. 17 is a screen shot of an example of a recent updates view displaying a start group chat selection mechanism.

As shown in FIG. 17, after the P2P server application 66 detects that a particular number of contacts 54 choose to "follow" the personal message blog for Device User, a group may be formed within the IM environment. A start group chat selection dialog 130 is displayed as shown in FIG. 17, to enable the "Nth" follower (Contact B in this example) to initiate a group chat by selecting a YES button 132 or decline creating the group by selecting a NO button 134. It can be appreciated that the group may instead be formed automatically and all of the potential group members provided an opportunity to accept or decline their addition to the group (or automatically without requiring approval from any or all potential members). Similarly, the option to create a group may be presented to the author of the personal message blog (i.e. Device User in this example), and invitations sent to the followers after the group is created. As such, it can be appreciated that various conditions under which a new group associated with the personal message blog is created may be imposed or not imposed. In the example shown in FIG. 17, by selecting the YES button 132, a new group chat view 140 may be generated as shown in FIG. 18, in which at least the most recent entry in the list 104 of personal message updates 28 may be populated in the chat view 140 as a message 146 from Device User. The chat view 140 thus enables the followers, i.e. Contact A and Contact B in this example, to message the Device User and other followers. As such, the personal message updates 28 for one user may be a catalyst or trigger for a new group chat thus enhancing the IM experience.

By detecting the frequency at which a user is changing a personal message 72, the P2P client application 52 can provide the user with an opportunity to more conveniently generate and post updates in a blogging type format. For the user's contacts 54, an opportunity to "follow" the user after a blogging mode has been initiated allows the contacts 54 to receive the personal message updates 28 in a social feed and thus independent of the IM environment. When multiple followers are detected, the P2P system 14 can provide an opportunity to create a discussion around one or more of the updates 28 by creating an IM group and allow a group chat to be initiated thus allowing the followers to message the user and each other.

FIG. 19 provides a flow chart illustrating an example of a set of computer executable operations that may be performed in enabling a blogging mode from personal status message updates 28. At 200, the P2P client application 52 detects an update to the personal message 72 and determines, at 202, whether or not "frequent" updates are being made. For example, one or more frequency metrics may be used to make the determination. at 202, as discussed above. If changes to the personal message 72 are considered to be frequent, an option to use the blogging mode is provided, at 204. For example, the selection dialog 96 shown in FIG. 11 may be displayed to the Device User. The P2P client application 52 determines, at 206, whether or not the blogging mode has been selected. If so, a blogging user interface is provided, at 208, e.g., by displaying the blogging user interface 102 (see FIG. 13), expanding the portion 82 of the profile view 80 (see FIG. 14), etc.

FIG. 20 provides a flow chart illustrating an example of a set of computer executable operations that may be performed in following a status update blog. At 210, the P2P client application 52 of a contact 54 of the Device User that has initiated the personal message blog, detects that the Device User is using the blogging mode, and provides the FOLLOW button 116, at 212, e.g., in the recent updates view 86. The P2P client application 52 determines whether or not the FOLLOW button 116 has been selected, at 214, and, if so, generates a social feed for the Device User, at 216, e.g., as shown in FIG. 16.

FIG. 21 provides a flow chart illustrating an example of a set of computer executable operations that may be performed in creating a group from a number of followers of a personal message blog. At 220, the P2P server application 66 detects a new follower of the personal message blog of the Device User and determines, at 222, whether or not there are a particular number of followers (X), e.g., five. If so, the P2P server application 66, in this example, provides an option to create a group chat related to the personal message blog, at 224. As discussed above, the P2P server application 66 may provide the option to the latest follower, all followers and/or the blogger, etc. The P2P server application 66 determines, at 226, whether or not the option to create a group chat has been selected. If so, a new group chat related to the personal message blog is created, at 228 and, optionally, a new IM group is created, at 230.

It can be appreciated that P2P server application 66 may instead automatically create the group based on a particular number of followers and thereafter provide the option to create a group chat. In another example, the P2P server application 66 may create the new group and allow any of the followers and/or the blogger to initiate the new group chat. In yet another example, the P2P server application 66 may create only a group chat (i.e., an "ad-hoc" group) without creating a formal group.

Accordingly, there is provided a method comprising: determining that a personal message for an instant messaging profile has been updated frequently according to at least one metric; providing an option to post subsequent personal messages in a blog; and after determining that the option has been selected, providing a user interface for entering and posting the subsequent personal messages in the blog.

There is also provided a method comprising: providing an option to follow a blog for a contact, the blog including a plurality of personal message updates for an instant messaging profile of the contact; and after determining that the option has been selected, generating a social feed for the blog.

There is also provided a method comprising: determining that a predetermined number of contacts have selected to follow a blog associated with instant messaging personal message updates for a mobile device; and providing an option to at least one of the mobile device and the contacts to participate in an instant messaging group.

There are also provided computer readable storage media with instructions for performing the above methods, and electronic devices operable to perform the above methods.

Figure 22:
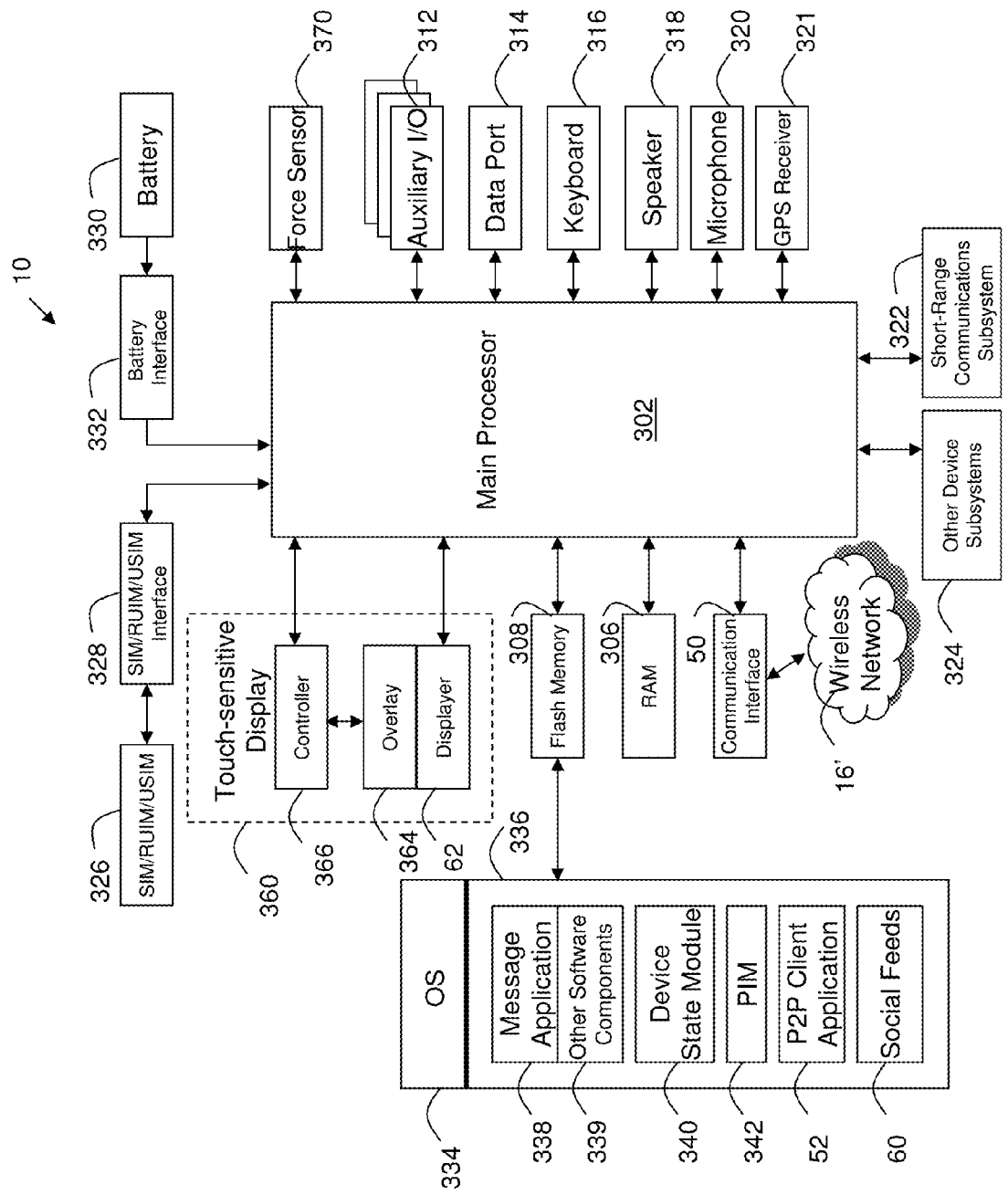
FIG. 22 is a block diagram of an example of a configuration for a mobile device.

Referring to FIG. 22, to further aid in the understanding of the example first and second devices 10a, 10b described above, shown therein is a block diagram of an example configuration of the first device 10a configured as a "mobile device", referred to commonly as "mobile device 10". The mobile device 10 includes a number of components such as a main processor 302 that controls the overall operation of the mobile device 10. Communication functions, including data and voice communications, are performed through a communication interface 50. The communication interface 50 receives messages from and sends messages to a wireless network 16'. In this example of the mobile device 10, the communication interface 50 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 50 with the wireless network 16' represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 322, and other device subsystems 324. Some of the subsystems of the mobile device 10 perform communication-related functions, whereas other subsystems may provide "resident" or on-device functions. By way of example, the touch-sensitive display 360 and the keyboard 316 may be used for both communication-related functions, such as entering a text message for transmission over the wireless network 16', and device-resident functions such as a calculator or task list. In one example, the mobile device 10 can include a non touch-sensitive display in place of, or in addition to the touch-sensitive display 360. For example the touch-sensitive display 360 can be replaced by a display 62 that may not have touch-sensitive capabilities.

The mobile device 10 can send and receive communication signals over the wireless network 16' after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 52, and 60. The operating system 334 and the software components 336 to 342, 52, and 60, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 52, and 60, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, a P2P client application 52, and a social feeds application 60. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 16'.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 16', the auxiliary I/O subsystem 312, the data port 314, the short-range communications subsystem 30, or any other suitable device subsystem 324.

The data port 314 can be any suitable port that enables data communication between the mobile device 10 and another computing device. The data port 314 can be a serial or a parallel port. In some instances, the data port 314 can be a Universal Serial Bus (USB) port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 62 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The displayer 32 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile devices 10, P2P system 14, any component of or related to the mobile devices 10, P2P system 14, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method comprising:
   determining that a personal status message for an instant messaging profile of a user in an instant messaging system changes at a frequency above a predetermined threshold, wherein updated personal status messages are sent to at least one user contact via the instant messaging system;
   in response to the determining, providing in a first user interface for changing the personal status message, an option to post subsequent personal status messages in a blog format in a blogging mode;
   after detecting that the option has been selected from the first user interface, initiating the blogging mode and providing a second user interface for entering and posting the subsequent personal status messages in the blog format with at least one previously posted personal status message from the first user interface;
   detecting an automatic update of the personal status message based upon at least one of an activity, an action or an accomplishment detected by a third party application;
   providing access to the second user interface in the blogging mode in response to detecting the automatic update; and
   communicating with the instant messaging system to enable the at least one contact to view the blog format and the subsequent personal status messages via the instant messaging system as the subsequent personal status messages are posted.

2. The method of claim 1, wherein the second user interface provides a separate instant messaging view.

3. The method of claim 1, wherein the second user interface comprises a modified portion of an instant messaging profile view provided in the first user interface, the instant messaging profile view including a presence status, and an option for changing the personal status message.

4. The method of claim 1, at least one personal status message update being provided automatically by the third party application.

5. The method of claim 4, wherein the third party application triggers the blog format in a blogging mode.

6. The method of claim 1, further comprising sending the personal status message to at least one contact and wherein the personal status message is associated with a peer-to-peer message containing a body and a header, the header including a message type field specifying a type of transmission, a source field specifying a device address for a sender device, a destination field specifying a device address or addresses for one or more intended recipient devices, and an identity field to identify a corresponding peer-to-peer application and wherein the message type field and the identity field are used to identify a sharing session.

7. A method comprising:
receiving a plurality of personal message updates from an instant messaging system in a first user interface, each update corresponding to a change to a personal status message for an instant messaging profile of a user for a contact in the instant messaging system;
receiving a communication from the instant messaging system to have the plurality of updates provided in a blog, the communication having been sent after determining that the personal status message has been changed at a frequency above a predetermined threshold by the contact and selection of an option to post subsequent personal status messages in a second user interface in a blog format with at least one previously posted personal status message, by the contact in the first user interface for changing the personal status message;
detecting an automatic update of the personal status message based upon at least one of an activity, an action or an accomplishment detected by a third party application;
providing an option to follow the blog of personal status message updates for the contact in response to detecting the automatic update; and
after determining that the option to follow the blog has been selected, generating a social feed for the blog.

8. The method of claim 7, further comprising:
determining that a predetermined number of followers has selected the option to follow the blog; and
providing an option to at least one electronic device and contacts corresponding to the followers to participate in an instant messaging group.

9. The method of claim 7, the personal status message updates being provided individually prior to the blog being created.

10. The method of claim 7, the social feed being generated in a different user interface than the instant messaging profile of the contact.

11. The method of claim 8, wherein selection of the option to participate in the group creates a new group conversation.

12. The method of claim 11, wherein the new group conversation comprises
an instant messaging conversation user interface created for the contact and each of the followers.

13. The method of claim 8, wherein selection of the option to participate in the group creates a new group.

14. The method of claim 8, wherein providing the option to participate in the group comprises displaying a prompt to enable a new group conversation to be initiated.

15. A non-transitory computer readable storage medium comprising computer executable instructions for:
determining that a personal status message for an instant messaging profile of a user in an instant messaging system changes at a frequency above a predetermined threshold, changes to the personal status message corresponding to updates to the instant messaging profile that are sent to at least one contact via an instant messaging system;
in response to the determining, providing in a first user interface for changing the personal status message, an option to post subsequent personal status messages in a blog format; in a blogging mode;
after detecting that the option has been selected from the first user interface, generating a second user interface along with at least one previously posted personal message, the second user interface used for entering and posting the subsequent personal status messages in the blog format;
detecting an automatic update of the personal status message based upon at least one of an activity, an action or an accomplishment detected by a third party application;
providing access to the second user interface in the blogging mode in response to detecting the automatic update; and
communicating with the instant messaging system to enable the at least one contact to view the blog format and the subsequent personal messages via the instant messaging system as the subsequent personal messages are posted.

16. An electronic device comprising a processor and memory, the memory comprising computer executable instructions for causing the processor to:
determine that a personal status message for an instant messaging profile of a user in an instant messaging system changes at a frequency above a predetermined threshold, changes to the personal status message corresponding to updates to the instant messaging profile that are sent to at least one contact via an instant messaging system;
in response to the determining, provide in a first user interface for changing the personal status message, an option to post subsequent personal status messages in a blog format in a blogging mode;
after detecting that the option has been selected from the first user interface, generate a second user interface for entering and posting the subsequent personal status messages in the blog format with at least one previously posted personal status message from the first user interface;
detecting an automatic update of the personal status message based upon at least one of an activity, an action or an accomplishment detected by a third party application;
providing access to the second user interface in the blogging mode in response to detecting the automatic update; and
communicate with the instant messaging system to enable the at least one contact to view the blog format and the subsequent personal status messages via the instant messaging system as the subsequent personal status messages are posted.

17. The non-transitory computer readable medium of claim 15, wherein the second user interface provides a separate instant messaging view in the blogging mode triggered by automatic updates from the third party application based on at least one of the detected activity, the detected action, or the accomplishment.

18. The non-transitory computer readable medium of claim 15, wherein the second user interface comprises a modified portion of an instant messaging profile view provided in the first user interface, the instant messaging profile view including an option for changing the personal status message.

19. A non-transitory computer readable storage medium comprising computer executable instructions for:

receiving a plurality of personal status message updates from an instant messaging system in a first user interface, each update corresponding to a change to a personal status message for an instant messaging profile for a contact in the instant messaging system;

receiving a communication from the instant messaging system to have the plurality of updates provided in a blog, the communication having been sent after determining that the personal status message has been changed at a frequency above a predetermined threshold by the contact and selection of an option to post subsequent personal status messages in a second user interface in a blog format in a blogging mode with at least one previously posted personal status message, by the contact in the user interface for changing the personal status message;

detecting an automatic update of the personal status message based upon at least one of an activity, an action or an accomplishment detected by a third party application;

providing an option to follow the blog of personal status message updates for the contact in the user interface in response to detecting the automatic update; and after determining that the option to follow the blog has been selected, generating a social feed for the blog.

20. The non-transitory computer readable storage medium of claim 19, further comprising instructions for: determining that a predetermined number of followers has selected the option to follow the blog; and providing by a peer-to-peer server application an option to at least one electronic device and contacts corresponding to the followers to participate in an ad-hoc instant messaging group.

* * * * *